Figure 1:
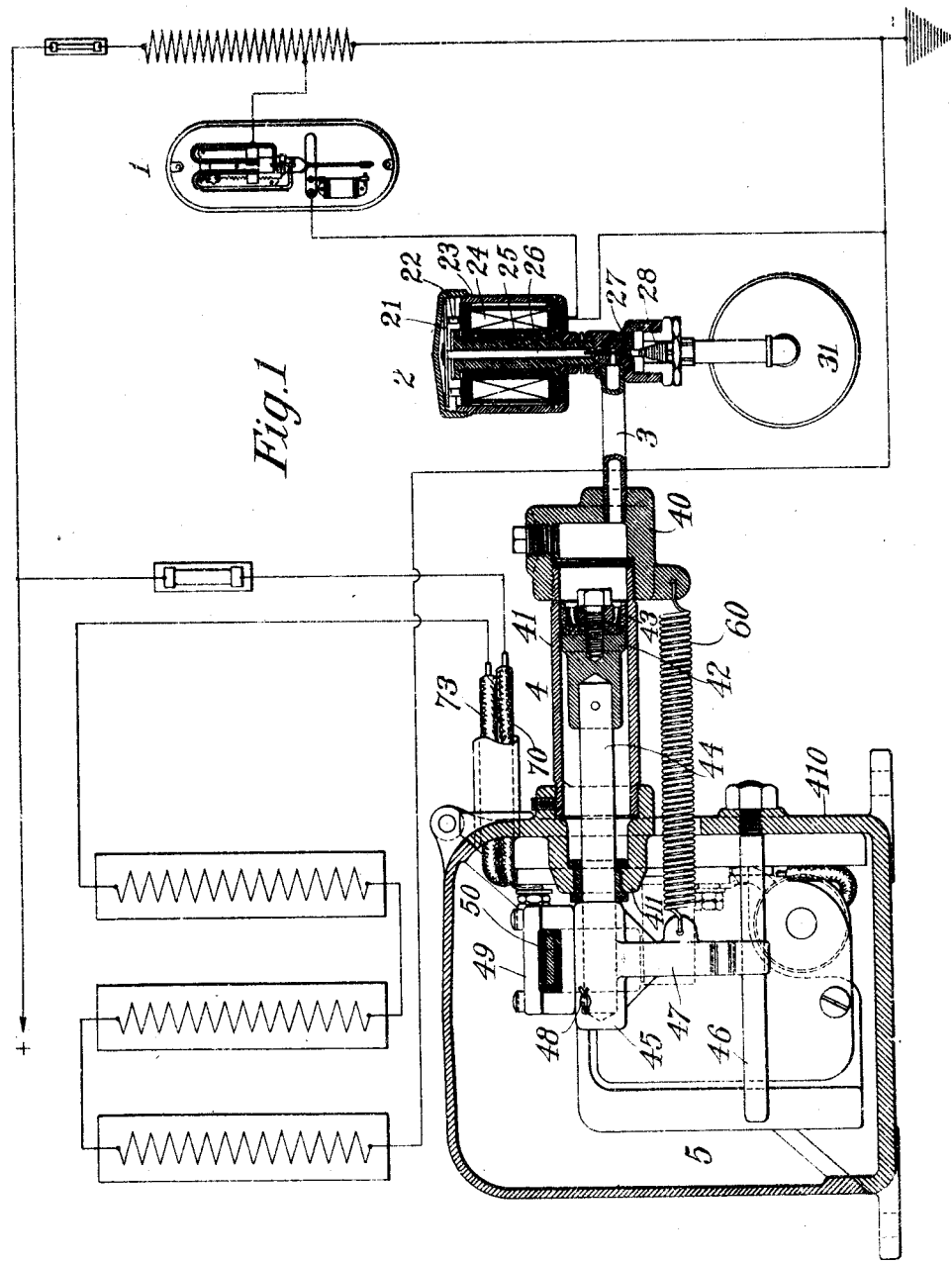

J. F. McELROY.
AUTOMATIC ELECTRIC HEATING SYSTEM.
APPLICATION FILED FEB. 27, 1912.

1,128,163.

Patented Feb. 9, 1915.
2 SHEETS—SHEET 1.

WITNESSES:
L. T. Shaw
W. C. Decker

INVENTOR
James F. McElroy
BY E. M. Bentley
ATTY

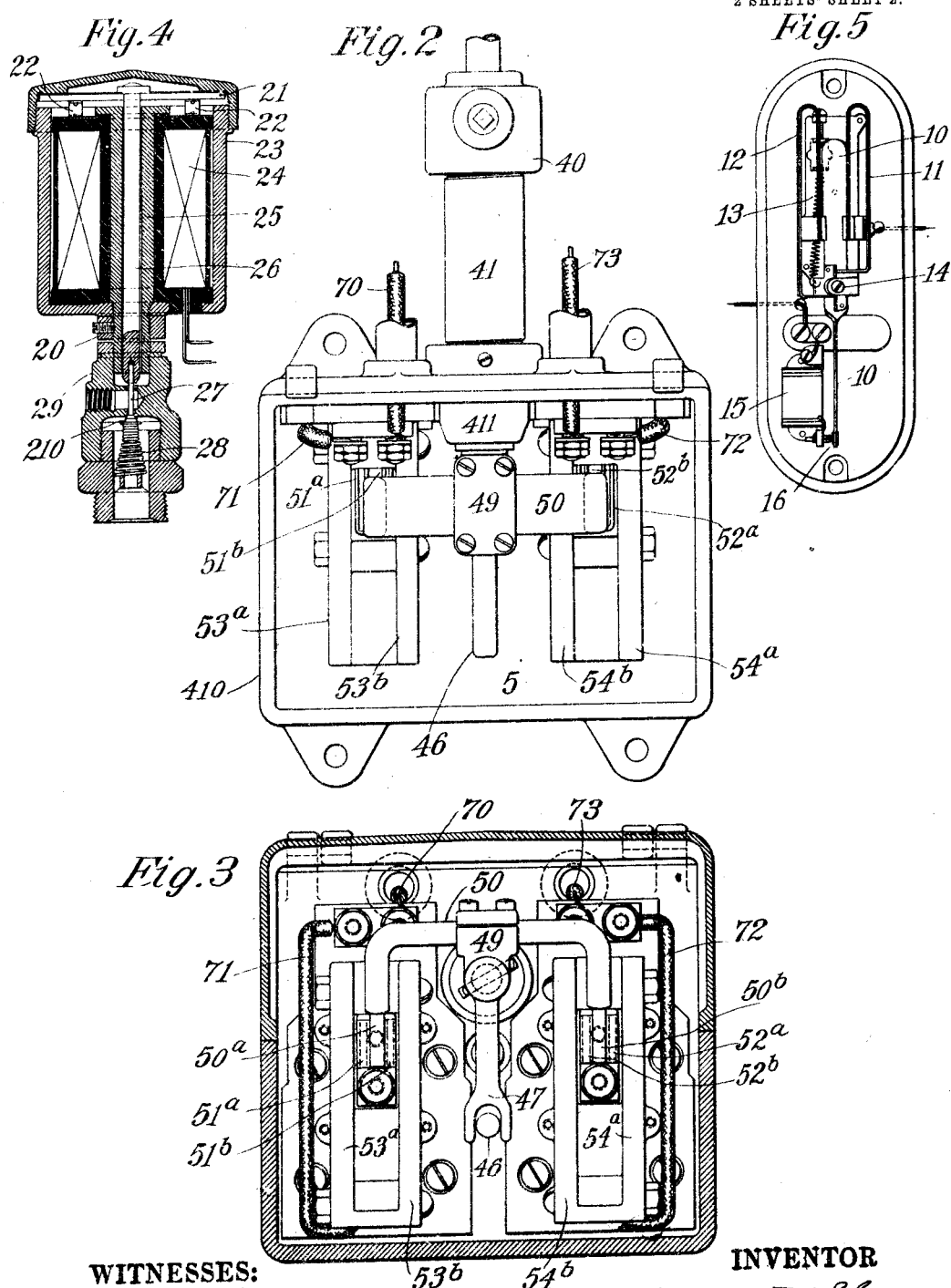

UNITED STATES PATENT OFFICE.

JAMES F. McELROY, OF ALBANY, NEW YORK, ASSIGNOR TO CONSOLIDATED CAR-HEATING COMPANY, A CORPORATION OF WEST VIRGINIA.

AUTOMATIC ELECTRIC HEATING SYSTEM.

1,128,163.

Specification of Letters Patent.

Patented Feb. 9, 1915.

Application filed February 27, 1912. Serial No. 680,229.

*To all whom it may concern:*

Be it known that I, JAMES F. MCELROY, a citizen of the United States, residing at Albany, county of Albany, State of New York, have invented certain new and useful Improvements in Automatic Electric Heating Systems, the following being a full, clear, and exact disclosure of the one form of my invention which I at present deem preferable.

For a detailed description of the present form of my invention, reference may be had to the following specification and to the accompanying drawings, which illustrate my invention.

Figure 1 is a diagram of apparatus including my improved switch, the switch itself being shown in section; Fig. 2 is a plan of the switch; Fig. 3 is a front elevation thereof; Fig. 4 shows the magnetic control valve and Fig. 5 shows the thermostat.

In the automatic control of electric heaters it has heretofore been the custom to provide a thermostat, which, in response to changes in temperature will act upon an electric circuit and cause a magnet in said circuit to operate the heater switch and thereby throw the heater in or out of its supply circuit. In my present invention I cause such a magnet to operate the control valves of a pneumatic cylinder the piston of which operates the heater switch. Moreover, I provide that the admission of air pressure to the said cylinder will cause it to act in a direction to open the heater circuit and thereby put it out of action. The air pressure will remain in the cylinder so long as the heater is out of action and when the thermostat again acts in response to a lower temperature, it will cause the release of the said air pressure, whereupon a spring will act to close the heater circuit and put the heater in action again. By this means no air pressure is expended during the major portion of the time that heaters are required in the car or other apartment which is to be heated, but only during the somewhat short periods when the heat is too great. I also employ but a single circuit for the thermostat, which results in much simplification of the entire apparatus and I cause the thermostat to close that circuit when the heat rises above the desired degree of temperature. The circuit then energizes the magnet therein which acts to admit air pressure to the cylinder, which thereupon opens the heater circuit. By this means the closed-circuit periods of the thermostat circuit correspond to open-circuit, or non-heating periods of the electric heater.

Turning to the drawings, the thermostat is shown in Fig. 1 at 1, the details thereof being found in Fig. 5 and also in my pending application Ser. No. 655,847, filed October 21, 1911, wherein it is claimed as my invention. In brief, it comprises a contact lever 10 pivoted at 14 with two J-shaped heat-responsive devices 11 and 12, each secured to the base at one extremity, while at their opposite extremities they bear loosely on lever 10 on opposite sides respectively of its pivotal point 14. The tip of lever 10 makes contact at 16 with a fixed circuit-terminal, the other terminal being the lever itself. The thermostat circuit contains a small magnet 15 which attracts the lever 10, that lever being of magnetic material, and holds it firmly in its contact position. The lever 10 is brought into such contact position by means of a spring 13 and is forced away from that position by the torsion of the elements 11 and 12 when the temperature falls.

The electromagnetic valve is shown at 2, the details thereof being found in Fig. 4 and in my application of even date herewith, wherein it is separately claimed.

In Fig. 4, a cylindrical magnetic shell is shown at 23 within which is a magnetic core 25 perforated axially to receive the non-magnetic rod 26. The core 25 passes through the bottom of shell 23 and there receives a nut 20 and also screws in a casting 29 containing the air chambers. The armature 21 is normally pressed away from the poles of the magnet by springs 22 and carries the aforesaid rod 26 which is beveled to conical shape at its lower end to form the exhaust valve, coöperating with a conical valve-seat in the partition beneath it. In the extremity of rod 26 a small hole is bored to receive the upper end of the stem 27 of the admission valve 210, which is normally pressed upward against its seat to close by a spring 28 in the air passage. The magnet-coils 24 are contained in shell 23 and surround core 25. When the magnet is energized, it draws down its armature 21 against springs 22 and thereby forces down rod 26 to close the exhaust valve and at the same time to press down stem 27 and open the admission valve 210. Conversely, when the magnet is deënergized, the exhaust valve is opened and the admission valve closed.

The pressure-operated switch is shown at 4 and is best illustrated in Fig. 1. The main casing 410 is of somewhat cubical shape with an inwardly extending guide-ring 411 for the piston rod. The cylinder 41 is outside of said casing and screwed into a boss thereon opposite the said guide-ring. At the outer end of cylinder 41 is a hollow casting 40 containing a chamber into which the compressed air from tank 31 enters when the magnetic valve 2 is opened. The piston 42 with its packing-ring 43 is pinned to the outer end of piston rod 44 which passes through and is guided by ring 411. On the inner end of rod 44 is mounted the carrier sleeve 45 detachably secured to the rod by a cotter-pin 48 and provided with a clamp 49 for the arched contact-bar of the switch and also with a radial rod 47 which loosely engages guide rod 46 to prevent axial rotation of the carrier, piston and piston rod. It will be observed that the pressure operating device thus described has a direct straight-line action on the switch, its stroke being equal to the range of throw of the switch itself. This avoids the use of levers and joints between the device and the movable element of the switch, and produces a reliable, definite and simple operation thereof.

The switch itself is shown at 5. The movable member is an arched contact-bar 50 which is coated with insulation except at its contact ends 50ª and 50ᵇ and is held in the aforesaid clamp 49 on the carrier 45. The stationary contact terminals are two in number and each is in the form of two looped springs between which one end of contact-bar 50 is gripped. Thus one of the fixed terminals comprises the looped springs 51ª and 51ᵇ between which is gripped the contact end 50ª of the bar 50; the other comprises the looped springs 52ª and 52ᵇ between which is gripped the contact end 50ᵇ of the bar 50. Each fixed contact terminal is inclosed in a recess formed of insulating plates, one recess being formed by plates 53ª, 53ᵇ, and the other by plates 54ª, 54ᵇ (see Figs. 2 and 3). Within these plates are embedded the pole-pieces of the blow-out magnets, which are not shown in detail since they form no part of my present invention. The circuit, entering by wire 70, goes to wire 71 and thence through one of the blow-out magnets to the terminal springs 51ª and 51ᵇ. Thence, when the circuit is closed, it passes by bar 50 to the terminal springs 52ª and 52ᵇ, and then, after passing through the other blow-out magnet, it goes by wire 72 to the outgoing wire 73.

By the arrangement above described the piston 42 has a straight-line stroke which drives the contact-bar 50 directly outward in a straight line to withdraw its ends 50ª and 50ᵇ directly outward away from the two fixed terminals to break the circuit. The circuit will remain open so long as air pressure is maintained in cylinder 41. When that pressure is released by a drop of temperature at the thermostat, a spring 60 interposed between the radial guide-arm 47 and the casting 40 comes into action and closes the circuit by driving the bar 50 into the grip of the fixed terminals. The radial rod 47 insures accurate entry of the bar into the terminals. That will close the heater-circuit which will remain closed until a rise of temperature at the thermostat again closes the thermostat circuit and again causes the magnetic valve 2 to admit air pressure to the cylinder 41. The result is that the closed-circuit periods of the thermostat circuit correspond to the open-circuit, or non-heating periods of the heater. That serves to limit the heating of the magnets 15 and 2 in the thermostat circuit and enables one thermostat circuit to do what has practically required two thermostat circuits acting alternately and momentarily, one to open and one to close the heater circuit.

What I claim as new and desire to secure by Letters Patent is:

1. In an electric heating system, the combination with an electric heater, of a switch controlling the same, a spring acting to hold said switch normally closed, a fluid pressure device for operating said switch to open the circuit, an electromagnetic valve controlling the supply of motive fluid, and a single circuit thermostat for closing the circuit to said valve when the temperature rises to a predetermined point.

2. The combination with an electric heating system of a switch controlling the same, a fluid-pressure opener for said switch, a spring closer for said switch, an electromagnetic valve controlling said opener, and a single circuit thermostat acting to close its circuit by increase of temperature and open it by decrease thereof.

3. In an electric heating system, the combination with an electric heating system, of a switch controlling the same, a thermostat acting to close its circuit to said switch on an increase of temperature and open it on a decrease thereof, a fluid pressure opener for said switch acting under pressure to separate the switch contacts, and an electromagnetic valve for said pressure device controlled by the thermostat circuit to admit pressure to said pressure device when the thermostat circuit is closed, whereby the closed circuit periods of the thermostat correspond to the non-heating periods of the electric-heater.

4. The combination with an electric heating system of a switch, a fluid-pressure opener for said switch, a spring closer for said switch, a control valve for said opener, including admission and exhaust ports, a magnet acting to close the exhaust and open the admission port, a spring acting to close the admission port, a thermostat-circuit containing the said magnet and a thermostat acting to close the said circuit on an increase and open it on a decrease of temperature.

5. In a heating system, the combination with a switch, of a switch opener actuated by fluid pressure to open the switch, automatic means for closing the switch, a source of fluid pressure supply for the opener, a valve controlling the pressure supply, and a circuit including the controlling valve and a thermostat for operating the valve.

In witness whereof I have hereunto set my hand before two subscribing witnesses, this 24th day of February, 1912.

JAMES F. McELROY.

Witnesses:
HERBERT A. CAULKINS,
CLARENCE PALMER.